United States Patent
Byrne

(10) Patent No.: US 12,543,057 B2
(45) Date of Patent: Feb. 3, 2026

(54) NETWORK DEVICE INVENTORY ANALYTICS

(71) Applicant: T-Mobile USA, Inc., Bellevue, WA (US)

(72) Inventor: Cameron Byrne, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 643 days.

(21) Appl. No.: 17/966,682

(22) Filed: Oct. 14, 2022

(65) Prior Publication Data

US 2024/0129761 A1   Apr. 18, 2024

(51) Int. Cl.
| | |
|---|---|
| *H04L 41/147* | (2022.01) |
| *H04L 43/065* | (2022.01) |
| *H04W 8/00* | (2009.01) |
| *H04W 24/08* | (2009.01) |
| *H04W 24/10* | (2009.01) |

(52) U.S. Cl.
CPC ........... *H04W 24/08* (2013.01); *H04L 41/147* (2013.01); *H04L 43/065* (2013.01); *H04W 8/005* (2013.01); *H04W 24/10* (2013.01)

(58) Field of Classification Search
CPC ..... H04W 24/08; H04W 8/005; H04W 24/10; H04W 4/24; H04L 41/147; H04L 43/065; H04L 41/082; H04L 41/0894; H04L 41/12; H04L 43/0876; H04L 67/54; H04L 43/16; H04L 67/535; G06F 11/3438; G06F 11/3006; G06F 11/3055; G06F 11/3419; G06F 11/3447; H04M 15/51; H04M 15/56; H04M 15/58; H04M 15/60; H04M 15/61

See application file for complete search history.

(56) References Cited

U.S. PATENT DOCUMENTS

| | | | |
|---|---|---|---|
| 8,125,927 B2 | 2/2012 | Nandy | |
| 9,660,868 B2 | 5/2017 | Mishra | |
| 11,271,217 B1 | 3/2022 | Workman | |
| 11,863,465 B1 * | 1/2024 | Nijim | H04L 47/805 |
| 2017/0344959 A1 * | 11/2017 | Bostick | H04W 4/021 |
| 2019/0190848 A1 | 6/2019 | Zavesky | H04L 47/821 |
| 2020/0196341 A1 * | 6/2020 | Mishra | H04W 84/18 |
| 2021/0219358 A1 * | 7/2021 | Alam | H04W 76/22 |
| 2022/0070723 A1 * | 3/2022 | Strater | H04W 84/12 |
| 2022/0255926 A1 * | 8/2022 | Crabtree | G06F 21/31 |
| 2024/0107314 A1 * | 3/2024 | Soryal | H04W 12/10 |

* cited by examiner

*Primary Examiner* — Cindy Trandai
(74) *Attorney, Agent, or Firm* — Lee & Hayes, P.C.

(57) ABSTRACT

A gateway within a home or other environment can wirelessly connect to a telecommunication network. One or more user devices at the home or other environment can connect to the gateway, such that the user devices can access the Internet via the gateway's wireless connection to the telecommunication network. The gateway can determine a device inventory of the connected devices, as well as data usage patterns indicating how the user devices have been used. The gateway, and other gateways, can provide such device inventories and data usage patterns to the telecommunication network. The telecommunication network can use the device inventories and data usage patterns to determine user profiles and usage trends, and to determine network actions and/or recommendations.

17 Claims, 6 Drawing Sheets

NETWORK DEVICE INVENTORY ANALYTICS

BACKGROUND

A telecommunication network, such as a fifth generation (5G) telecommunication network, can provide wireless data connections to various types of devices. For example, mobile phones can wirelessly connect to the telecommunication network to make phone calls, access the Internet, and/or engage in other types of services.

A gateway, such as a modem and/or router, can also wirelessly connect to the telecommunication network. Computers, tablets, gaming systems, media streaming devices, and/or other types of devices can connect to the gateway, such that the devices can access the Internet via the gateway's wireless connection to the telecommunication network. For example, the gateway may be located in a home and be wirelessly connected to the telecommunication network, such that one or more other devices within the home can access the Internet by connecting to the gateway.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Gateways, such as routers and/or modems, can wirelessly connect to a telecommunication network. User devices can connect to individual gateways, such that the user devices can access the Internet via wireless connections between the gateways and the telecommunication network.

For example, a gateway can be located within a home, and can provide a local Wi-Fi® network within the home. Accordingly, user devices such as computers, smartphones, gaming devices, media streaming devices, smart appliances, and/or other user devices within the home can connect to the local Wi-Fi® network provided by the gateway, and thus access the Internet via the gateway's wireless connection to the telecommunication network.

Gateways can be located in different homes, offices, and/or other environments. Different gateways may be associated with different numbers of user devices, and/or different usage data patterns. For example, a first gateway may be located in a first home where multiple users reside, and where numerous user devices are being used to send and/or receive data via the first gateway almost constantly each day. A second gateway may instead be located in a second home where only a single user resides, and where only a single personal computer is occasionally used to browse the Internet via the gateway on nights and weekends. Accordingly, in this example, the first gateway may routinely handle larger amounts of data overall, and for a higher number of user devices, than the second gateway.

However, it can be difficult to determine how individual gateways are being used, and/or how usage of gateways is likely to change over time. For example, it can be difficult to determine which users, and/or how many users, are using user devices via a particular gateway. As another example, it can be difficult to determine how usage of gateways may change in the future. Accordingly, it can be difficult to determine whether additional network resources, or other changes to the telecommunication network, may help handle future increases in usage of gateways or other future changes in how gateways are used.

The systems and methods described herein can allow individual gateways to determine device inventories and data usage patterns associated with sets of user devices connected to the gateways. The gateways can provide the device inventories and data usage patterns to a telecommunication network, such that the telecommunication network can use the device inventories and data usage patterns to determine user profiles, monitor changes to usage of gateways over time, and proactively mitigate potential network issues that might otherwise be caused by usage of the gateways and/or changes to usage of the gateways over time.

Example Environment

Figure 1:
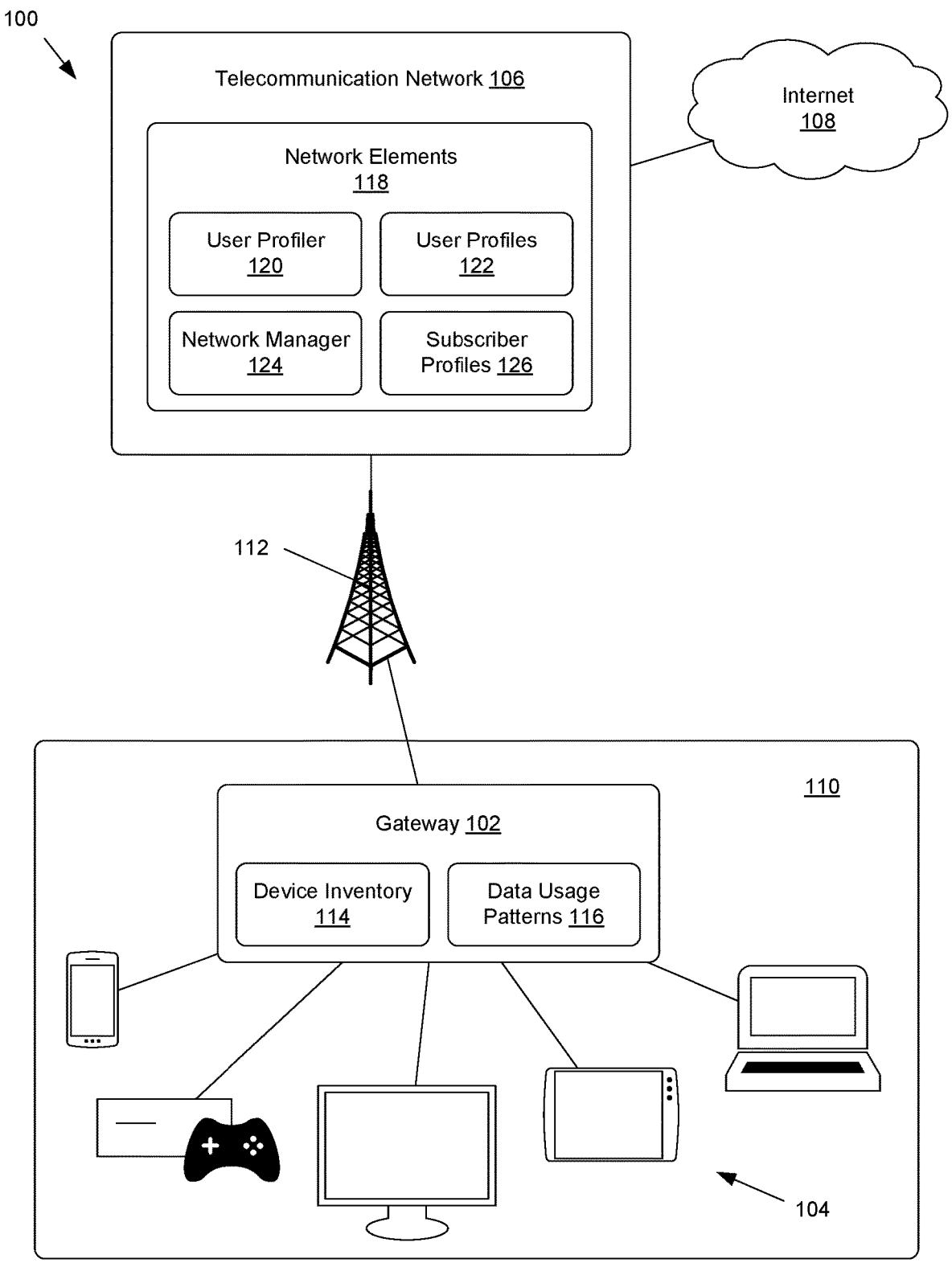
FIG. 1 shows an example of a network environment in which a gateway can connect one or more user devices to a telecommunication network.

FIG. 1 shows an example 100 of a network environment in which a gateway 102 can connect one or more user devices 104 to a telecommunication network 106. The gateway 102 can be a modem, router, and/or other network element that can wirelessly connect to the telecommunication network 106. The gateway 102 can also provide user devices 104, connected to the gateway 102, with access to the Internet 108 via the telecommunication network 106. The gateway 102 can, for example, be located within an environment 110, such as a home or office, and provide Internet access to user devices 104 in or around the environment 110.

The user devices 104 can include one or more types of devices that can connect to the gateway 102 via wireless and/or wired connections. For example, the user devices 104 can include mobile phones, tablet computers, personal digital assistants (PDAs), media players, gaming devices, smart televisions, smart watches, smart appliances, Internet of Things (IoT) devices, personal computers (PCs), such as laptops, desktops, or workstations, or any other type of computing or communication device.

The telecommunication network 106 can include an access network, such as a radio access network (RAN), that includes one or more base stations 112 and/or other access points. The telecommunication network 106 can also include a core network linked to the access network. The gateway 102 can wirelessly connect to one or more of the base stations 112 of the access network, and in turn be connected to the core network via the one or more base stations 112. The core network can also be linked to the Internet 108 and/or other networks. Accordingly, the gateway 102, and user devices 104 connected to the gateway 102, can access the Internet 108 via the telecommunication network 106.

The gateway 102 and the telecommunication network 106 can be compatible with one or more radio access technologies, wireless access technologies, protocols, and/or standards. For example, the gateway 102 and/or the telecommunication network 106 can support fifth generation (5G) New Radio (NR) technology, Long-Term Evolution (LTE)/LTE Advanced technology, other fourth generation (4G) technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMax® technology, Wi-Fi® technology, and/or any other previous or future generation of radio access technology.

For example, the gateway 102 can be configured to provide a local Wi-Fi® network for user devices 104 in and/or around the environment 110. The gateway 102 can also wirelessly communicate with one or more base stations 112 via 5G connections, LTE connections, or other types of wireless connections.

In some examples, the telecommunication network 106 can be based on 5G technologies. The telecommunication network 106 can, for instance, include a 5G access network, and the base stations 112 can be 5G gNBs. The gateway 102 can thus wirelessly connect to one or more gNBs via 5G connections. The telecommunication network 106 can also include a 5G core network linked to the 5G access network.

In other examples, the telecommunication network 106 can be based on LTE technologies. The telecommunication network 106 can, for instance, include an LTE access network known as an Evolved UMTS Terrestrial Radio Access Network (E-UTRAN), and the base stations 112 can be evolved Node Bs (eNBs) of the LTE access network. The gateway 102 can thus wirelessly connect to one or more eNBs via LTE connections. The telecommunication network 106 can also include an LTE core network, known as an Evolved Packet Core (EPC), linked to the LTE access network.

In still other examples, telecommunication network 106 can be based on multiple generations of technologies. For instance, the base stations 112 can be gNBs of a 5G access network, but be linked to an LTE core network within the telecommunication network 106. Accordingly, the gateway 102 can wirelessly connect to one or more gNBs via 5G connections, while backend processing in the core network can be based at least in part on LTE technologies.

The user devices 104 can be compatible with one or more types of wired and/or wireless connections that can connect the user devices 104 to the gateway 102, such as Wi-Fi® connections, wired Ethernet connections, or other types of connections. Accordingly, the user devices 104 can connect to the gateway 102 via wired and/or wireless connections. The gateway 102 can thus provide the connected user devices 104 with access to the Internet 108, via a wireless connection between the gateway 102 and the telecommunication network 106 through one or more of the base stations 112.

In some examples, one or more of the user devices 104 may also be compatible with one or more radio access technologies, wireless access technologies, protocols, and/or standards supported by the telecommunication network 106, such as 5G and/or LTE technologies. For instance, some user devices 104 may be smartphones that are capable of connecting to base stations 112, such as gNBs or eNBs. However, as described herein, such user devices 104 can additionally, and/or instead, access the Internet 108 via connections to the gateway 102 while the user devices 104 are at or around the environment 110 and are within a connection range of the gateway 102. As an example, if the gateway 102 is installed within a user's home, the user's smartphone may access the Internet 108 via a Wi-Fi® connection with the gateway 102 instead of, or in addition to, a 5G connection with one of the base stations 112 when the smartphone is present within the user's home.

The gateway 102 can be configured to generate and maintain a device inventory 114 of the user devices 104 that are, or have, connected to the gateway 102. The device inventory 114 can indicate how many user devices 104 are, and/or have, connected to the gateway 102. The device inventory 114 can also indicate one or more identifiers of each of the user devices 104, a name, type, and/or classification of each of the user devices 104, and/or other information about each of the user devices 104.

The gateway 102 can also be configured to determine data usage patterns 116 associated with any or all of the user devices 104. For example, the data usage patterns 116 can indicate which of the user devices 104 have sent and/or received data via the gateway 102, when the user devices 104 have sent and/or received data via the gateway 102, how much data the user devices 104 have sent and/or received data via the gateway 102, services used by the user devices 104 via the Internet 108 through the gateway 102, when such services are being used by user devices 104 via the gateway 102, and/or other types of data usage patterns 116 associated with one or more user devices 104 sending and/or receiving data via the gateway 102.

The gateway 102 can send copies of the device inventory 114 and/or the data usage patterns 116 to one or more network elements 118 of the telecommunication network 106. For example, the gateway 102 can periodically or occasionally send copies of the device inventory 114 and/or the data usage patterns 116, for example the device inventory 114 and/or the data usage patterns 116 have been updated, to the one or more network elements 118. The one or more network elements 118 of the telecommunication network 106 can include one or more servers, network functions, nodes, and/or other elements of the telecommunication network 106. The network elements 118 can have a user profiler 120 that can determine user profiles 122 associated with the gateway 102 based on the device inventory 114 and/or the data usage patterns 116, as discussed further below. The network elements 118 can also have a network manager 124 that can recommend and/or perform network actions based on the device inventory 114 and/or the data usage patterns 116, as discussed further below.

The gateway 102 can generate and/or update the device inventory 114 by identifying and/or classifying individual user devices 104. The gateway 102 can identify and/or classify user devices 104 by fingerprinting the user devices 104 based on identifiers of the user devices 104, data usage patterns 116 associated with the user devices 104, connection types associated with the user devices 104, and/or other information. When the gateway 102 identifies and/or classifies a user device, the gateway 102 can add or update corresponding information associated with the user device to the device inventory 114.

In some examples, the gateway 102 can detect and/or identify different user devices 104 based at least in part on distinct and/or unique identifiers associated with the different user devices 104. The identifiers can be Internet Protocol (IP) addresses, Media Access Control (MAC) addresses, and/or other identifiers associated with individual user devices 104. As an example, when each of the user devices 104 connects to the gateway 102, the gateway 102 can assign IP addresses to the user devices 104, such that the gateway 102 can identify each user device, and exchange data with each user device, based on the IP address associated with each user device. As another example, MAC addresses of user devices 104 can be assigned to the user devices 104 by manufacturers of the user devices 104, and can be provided by the user devices 104 to the gateway 102 when the user devices 104 connect to the gateway 102. Accordingly, different user devices 104 connected to the gateway 102 can have different MAC addresses, such that the gateway 102 can detect and/or identify different user devices 104 based on the corresponding MAC addresses, and add corresponding information to the device inventory 114.

In addition to distinguishing between user devices 104 based on IP addresses, MAC addresses, and/or other identifiers, the gateway 102 can also determine device types, names, manufacturer names, and/or other classifications of user devices 104 based at least in part on such identifiers. For example, the gateway 102 can be configured with MAC address ranges that correspond to different manufacturers and/or device types. Accordingly, if the MAC address of a particular user device falls within a MAC address range associated with a particular manufacturer and/or device type, the gateway 102 can determine that the particular manufacturer and/or device type is associated with the particular user device, and can add corresponding information to the device inventory 114.

In some examples, the gateway 102 can also, or alternately, determine device types, names, manufacturer names, and/or other classifications of user devices 104 based at least in part on corresponding data usage patterns 116 associated with the user devices 104. As discussed above, the gateway 102 can identify each of the user devices 104 based on corresponding IP addresses, MAC addresses, and/or other identifiers. Accordingly, the gateway 102 can track and determine data usage patterns 116 indicating network activity each of the individual user devices 104 engages in via the gateway 102, such as which external IP addresses each of the user devices 104 sends data to and/or receives data from, domain names indicated by Domain Name System (DNS) queries sent by the user devices 104, amounts of data sent and/or received by the user devices 104, times and/or durations of uploads and/or downloads performed by the user devices 104, and/or other types of network activity.

For example, over a period of time, the gateway 102 can determine a data usage pattern associated with a particular connected user device. For instance, by tracking data sent and received via the gateway 102 in association with an IP address that corresponds with the particular connected user device, the gateway 102 can determine when the user device sends and receives data, how much data the user device sends and receives, which Internet sites and/or IP addresses the user device communicates with, and/or other information about when and how the user device accesses the Internet 108.

Different types of user devices 104, and/or user devices 104 produced by different manufacturers, may be associated with different types of data usage patterns 116. Accordingly, the gateway 102 can use such data usage patterns 116 to determine information about user devices 104 that the gateway 102 can add to the device inventory 114.

As an example, if a user device manufactured by a particular manufacturer is configured to periodically send health check messages to a server associated with the particular manufacturer, data usage patterns 116 may indicate that the particular user device periodically sends DNS queries to resolve a Uniform Resource Locator (URL) that includes a domain name associated with the particular manufacturer. Accordingly, because the user device periodically attempts to send data in association with a domain name that corresponds with the particular manufacturer, the gateway 102 can determine that the user device was manufactured by that particular manufacturer. The gateway 102 can thus indicate the name of the particular manufacturer in the device inventory 114 in association with an entry for the user device.

As another example, different user devices 104 produced by the same manufacturer may send and/or receive data in association with different servers, URLs, IP addresses, and/or other network resources of the manufacturer. For instance, a gaming console produced by a manufacturer may routinely use a first URL to communicate with a gaming server provided by the manufacturer, while a smart speaker produced by the same manufacturer may routinely use a second URL to communicate with a separate media server provided by the manufacturer instead of the gaming server. Accordingly, although in this example the different user devices 104 may be associated with the same manufacturer, the gateway 102 can determine different data usage patterns 116 associated with the different user devices 104, and infer device types of the different user devices 104 based on the data usage patterns 116. The gateway 102 can thus add indicators of the device types to the device inventory 114 instead of, or in addition to, the manufacturer name in association with entries for the user devices 104.

As yet another example, if data usage patterns 116 indicate that a user device routinely sends requests to IP addresses associated with one or more media streaming services, and/or receives data substantially continuously during periods of time that are equivalent to average lengths of movies and/or television shows, the gateway 102 can infer that the user device is a media streaming device, smart television, computer, or other device capable of streaming video from media streaming services. The gateway 102 may also infer from such data usage patterns 116 that the user device is not an IoT device, or other type of device that may be more likely send and/or receive smaller amounts of data. As discussed further below, if such data usage patterns 116 indicate that a user device may be any of a set of device types, the gateway 102 can use other factors, such as a MAC address or other identifier of the user device, to narrow down which of those device types is associated with the user device.

In some examples, the gateway 102 can also, or alternately, determine a device type or other classification of a user device based in part on a connection type indicating how the user device connects to the gateway 102. For example, some types of user devices 104 may lack wireless connection hardware, and rely on wired Ethernet connections. Other types of user devices 104 may support one or more types of wireless connections, such as 2.4 GHz Wi-Fi® connections and/or 5 GHz Wi-Fi® connections. Still other user devices 104 may have hardware that supports both wired connection and one or more types of wireless connections. Accordingly, based on which type of connection a user device uses to connect to the gateway 102, the gateway 102 may be able to determine a type of the user device, or determine that the user device is not one or more types of user devices. For instance, if a particular user device is connected to the gateway 102 via a 5 GHz connection, the gateway 102 can determine that the particular user device is not one or more types of user devices that do not support 5 GHz connections.

In some examples, the gateway 102 can use a combination of factors to fingerprint a user device. For instance, if a MAC address of a user device indicates that the user device is associated with a particular manufacturer, but that manufacture produces multiple types of user devices, the gateway 102 can use data usage patterns 116 associated with the user device to narrow down the type of user device associated with the user device. For instance, if a manufacturer produces streaming media players and smart refrigerators, one of the streaming media players may commonly receive larger amounts of data, and/or receive data more frequently, than one of the smart refrigerators, such that the streaming media players and the smart refrigerators are associated with different data usage patterns 116. Accordingly, if the MAC address of the user device is associated with a manufacturer, but is not sufficient to determine the type of the user device, a data usage pattern associated with the user device can indicate the type of the user device.

Accordingly, the gateway 102 can have one or more heuristic algorithms, machine learning systems, rule-based models, and/or other models that can use a combination of multiple factors to determine device types, manufacturer names, and/or other information associated with user devices 104. For example, heuristic algorithms can indicate combinations of MAC address ranges, attributes of data usage patterns 116, connection types, and/or other factors that correspond with certain manufacturers and/or types of user devices 104. Accordingly, if a particular user device has a MAC address associated with a particular manufacturer and exhibits data usage patterns 116 that match data usage patterns 116 associated with a particular model or type of user device produced by that manufacturer, the gateway 102 can determine that the particular user device is an instance of that model or type of user device produced by the manufacturer, and can add that information to the device inventory 114. Similarly, based on a sample set of identifiers, data usage patterns 116, connection types, and/or other information associated with known user devices, a neural network or other type of machine learning model can be trained to predict a name, device type, manufacturer name, and/or other attributes of user devices 104 based on identifiers, data usage patterns 116, connection types, and/or other information determined by the gateway 102 in association with those user devices 104.

In some examples, the gateway 102 can determine the device inventory 114 and/or the data usage patterns 116 as discussed above, and can send copies of the device inventory 114 and/or the data usage patterns 116 to one or more network elements 118 of the telecommunication network 106. In other examples, the gateway 102 can send identifiers of user devices 104, usage data associated with user devices 104, and/or other information to one or more of the network elements 118, such that one or more of the network elements 118 can use that information to determine the device inventory 114 and/or the data usage patterns 116.

One or more of the network elements 118 can use the user profiler 120 to determine user profiles 122 associated with the gateway 102, based on the device inventory 114 and/or the data usage patterns 116. Although the gateway 102 can be associated with a single user account with the telecommunication network 106, the user devices 104 may be associated with multiple users. For example, a subscriber of the telecommunication network 106 can sign up to use the gateway 102 within the subscriber's home. The subscriber may be associated with one of a set of subscriber profiles 126 maintained by the telecommunication network 106, as discussed further below. However, although the subscriber may reside at the home and connect his or her user devices 104 to the gateway 102, family and friends of the subscriber may also connect their user devices 104 to the gateway 102.

Accordingly, the user profiler 120 can use data usage patterns 116 associated with different user devices 104 to determine and/or estimate how many individual users are associated with the user devices 104 connected to the gateway 102, and/or determine how such users use those user devices 104. The user profiler 120 can also generate user profiles 122 corresponding to the individual users. The user profiles 122 can indicate which user devices 104 are used by individual users, which services are used by individual users, life events associated with the individual users, and/or other information.

For example, the device inventory 114 may indicate that the user devices 104 include a computer and a gaming console. The data usage patterns 116 may indicate that the computer is often used for video meetings on weekdays between 9 am and 6 pm, and that the gaming console is often used for online gaming during weekday afternoons after school hours. It may be unlikely that the same user is playing online games during work video calls. Accordingly, the user profiler 120 may determine from the device inventory 114 and the data usage patterns 116 that it is likely that at least two users are associated with the environment 110, such as a first user that uses the computer and a second user that uses the gaming console. The user profiler 120 can thus generate user profiles 122 for the first user and the second user, and/or edit previously one or more existing user profiles 122, to indicate user devices 104, services, and other information associated with the first user and the second user.

As discussed above, the network elements 118 can have, or can have access to, subscriber profiles 126 associated with subscribers to the telecommunication network 106. For example, subscribers can have accounts with the owner or operator of the telecommunication network 106, and the subscribers can be associated with corresponding subscriber profiles 126. Subscriber profiles 126 can indicate subscriber names, billing addresses, credit card information or other payment information, and/or other information. The gateway 102 can accordingly be associated with one of the subscriber profiles 126, such as a subscriber profile associated with a subscriber who has an account with the telecommunication network 106 that allows the gateway 102 to connect to the telecommunication network 106. The one or more user profiles 122 associated with the gateway 102, determined by the user profiler 120, can be linked to the subscriber profile associated with the gateway 102. In some examples, the network elements 118 can determine a location of the gateway 102 and/or the environment 110, for instance based on a billing address indicated in a corresponding subscriber profile and/or based on locations of one or more base stations 112 the gateway 102 connects to.

In some examples, the user profiler 120 may determine life events of one or more users, based on the device inventory 114 and/or the data usage patterns 116. For example, if the gateway 102 determines that a baby monitor has been added to the group of user devices 104 connected to the gateway 102, the user profiler 120 may determine that one or more of the users associated with the gateway 102 recently had a baby, and can indicate that information in corresponding user profiles 122. As another example, if the device inventory 114 and/or the data usage patterns 116 previously indicated usage of one user device at a time, that information may be consistent with a single user residing at a home and most often using a single user device at a time. However, if the device inventory 114 and/or the data usage patterns 116 change to indicate more consistent simultaneous usage of multiple user devices 104, the user profiler 120 may determine that at least one additional user has moved into the home. The user profiler 120 can accordingly generate one or more new corresponding user profiles 122. As described further below, the network manager 124 can also determine from such changes to the device inventory 114 and/or the data usage patterns 116, indicating more consistent simultaneous usage of multiple user devices 104, that the gateway 102 is likely to use more data in the future relative to previous usage levels.

The user profiles 122 may indicate preferences and/or usage data associated with corresponding users. For example, the user profiles 122 can indicate which user devices 104 individual users use, types of services the users engage in via user devices 104, days and/or times of day the users use the user devices 104 and/or particular services, life events of the users, and/or other information.

In some examples, one or more of the network elements 118 can be configured to determine marketing recommendations associated with one or more users, based on corresponding user profiles 122, the device inventory 114, the data usage patterns 116, and/or other information. For example, if the device inventory 114 indicates that one of the user devices 104 is a smart television produced by a first manufacturer, the network elements 118 may generate a recommendation to send an advertisement for a new smart television produced by a second manufacturer to a user associated with the environment 110, or a recommendation to send an advertisement for other devices produced by the first manufacturer to the user associated with the environment 110. Such recommendations may be output by one or more of the network elements 118 in reports, presented in user interfaces, and/or otherwise provided to one or more recipients.

The network manager 124 can use the device inventory 114, data usage patterns 116, and/or user profiles 122 to determine how to prioritize data passing through the gateway 102. The network manager 124 can have prioritization rules indicating which types of user devices 104, users, services, and/or other elements should be prioritized over others. Accordingly, the network manager 124 can provide the gateway 102 with local prioritization policy data indicating that data associated with one user should be prioritized over data associated with another user, or that data associated with one or more types of services should be prioritized over data associated with other types of services.

As an example, the user profiler 120 may determine from the device inventory 114 and/or data usage patterns 116 that a first user associated with the environment 110 commonly uses a laptop computer for video calls at a certain time of day during work hours, and that other users often use one or more other user devices 104 to watch videos via media streaming services at the same time of day. The network manager 124 can be configured with prioritization rules indicating that video calls are to be given higher priority than streaming video. Accordingly, the network manager 124 can provide local policy data instructing the gateway 102 to prioritize data associated with the laptop computer and/or video call services, at least at the time of day when the first user normally engages in video calls. As such, if there is congestion in the telecommunication network and/or issues with a wireless connection between the gateway 102 and one or more base stations 112, which might otherwise prevent the gateway 102 from handling data for both video calls and streaming video, the gateway 102 can follow the local policy data to prioritize the video call data and thereby avoid disruptions to the first user's video calls due to the other users' use of streaming video services.

As another example, if the network manager 124 determines from the device inventory 114 that the user devices 104 include multiple computers, a backup device that backs up data from the computers to a hard drive or other storage, and a media streaming device, the network manager 124 may determine that the backup device has the lowest priority among the user devices 104, and can provide the gateway 102 with a corresponding prioritization policy. Accordingly, the prioritization policy can configure the gateway 102 to prioritize data associated with the computers and the media streaming device, and de-prioritize data passing to the backup device, as users may be less likely to notice delays in backup operations relative to interruptions to media streaming or data being downloaded to the computers.

In some examples, the gateway 102 can also, or alternately, have an instance of the network manager 124. Accordingly, in these examples the gateway 102 can locally determine prioritization policies based on user profiles 122, the device inventory 114, the data usage patterns 116, and/or other factors, instead of or in addition to such policies being determined by the network manager 124 at one or more of the network elements 118 of the telecommunication network 106.

The network manager 124 can also be configured to determine trends associated with the device inventory 114 and/or data usage patterns 116 over a period of time. As an example, the network manager 124 can determine that the device inventory 114 has grown from a list of five user devices 104 to a list of fifteen user devices 104 over a three-month period, and/or can determine that the gateway 102 is now handling more data for the set of fifteen user devices 104 that it did for the previous set of five user devices 104. As another example, the network manager 124 can determine from the device inventory 114 that a 1080p television has been replaced within the environment 110 with a 4K television, and/or determine from the data usage patterns 116 that the gateway 102 is now handling more data for 4K resolution video streams displayed via the 4K television relative to HD resolution video streams previously displayed by the 1080p television.

Similarly, the network manager 124 can predict future changes to the data usage patterns 116, based on the device inventory 114, previous data usage patterns 116, user profiles 122, and/or other information. As an example, in a situation in which the device inventory 114 indicates that a 1080p television has been replaced within the environment 110 with a 4K television that may be expected to consume higher amounts of data for higher-resolution video streams than the 1080p television, the network manager 124 can predict that the gateway 102 will be handling higher amounts of data in the future. As another example, if the user profiles 122 indicate that additional users have moved into the environment 110, the network manager 124 can also predict that the gateway 102 will be handling higher amounts of data in the future.

In some examples, the network manager 124 can use one or more heuristic algorithms, machine learning systems, rule-based models, and/or other models to predict future changes to usage of the gateway 102, based on the device inventory 114, previous data usage patterns 116, user profiles 122, and/or other information. For example, based on a sample set of training data indicating how changes to device inventories, data usage patterns 116, user profiles 122, and/or other factors associated with a sample set of gateways in other environments lead to changes in usage of the gateways, a neural network or other type of machine learning model can be trained to predict changes in future usage of the gateway 102 based on similar factors.

Figure 2:
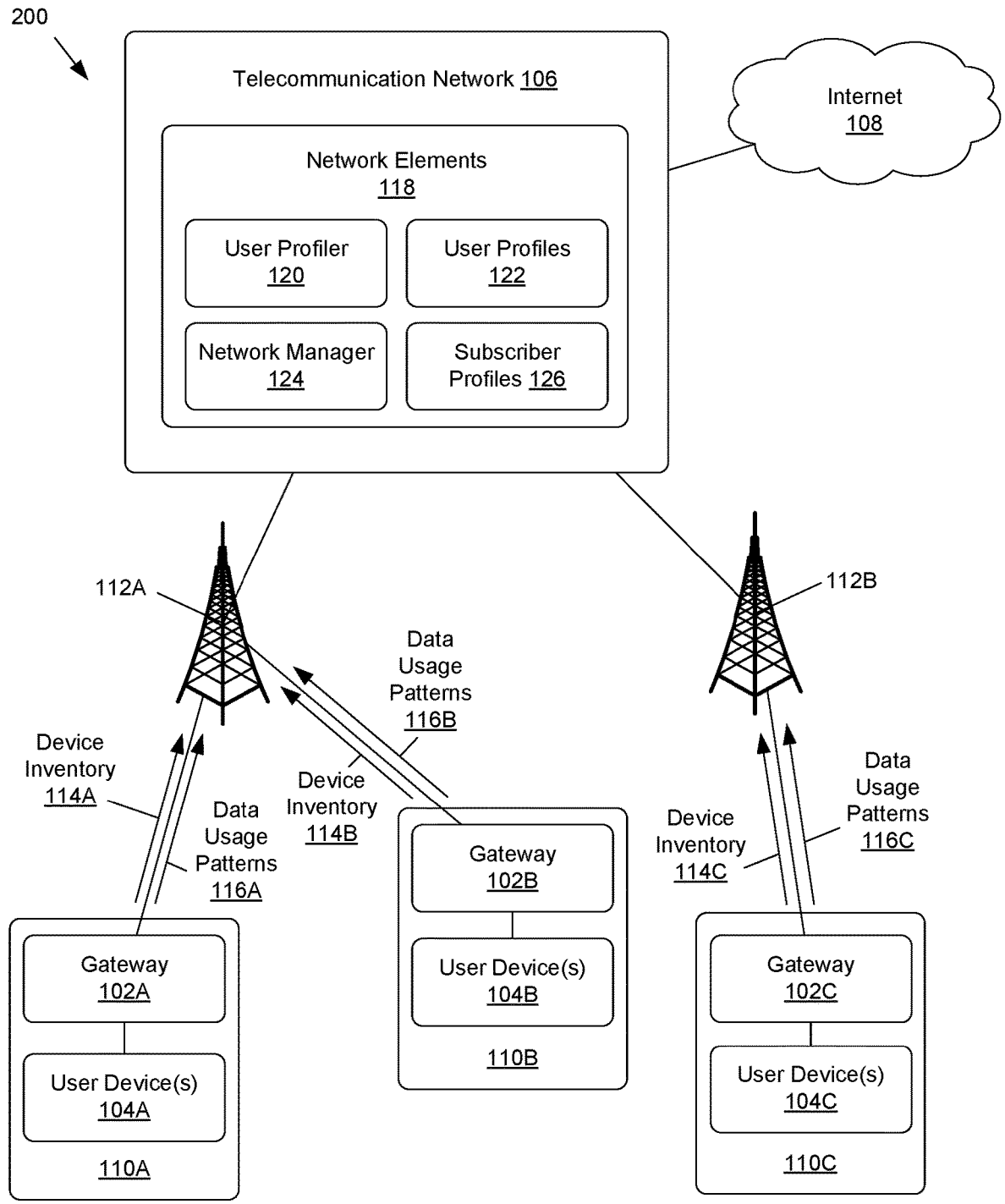
FIG. 2 shows an example of a network environment in which multiple gateways can connect corresponding sets of user devices to the telecommunication network.

Although FIG. 1 shows a single gateway 102 connected to the telecommunication network 106, multiple gateways 102 associated with multiple environments 110 can be connected to the telecommunication network 106. For example, FIG. 2 shows an example 200 of a network environment in which multiple gateways 102 can connect corresponding sets of user devices 104 to the telecommunication network 106.

Different gateways 102 can be associated with different environments, and can be associated with different sets of user devices 104. For example, as shown in FIG. 2, a first gateway 102A can be located at a first environment 110A and can be associated with a first set of user devices 104A, a second gateway 102B can be located at a second environment 110B and can be associated with a second set of user devices 104B, and a third gateway 102C can be located at a third environment 110C and can be associated with a third set of user devices 104C.

Different gateways 102 may connect to the same base stations 112, or different base stations 112, of the telecommunication network 106. For example, as shown in example 200, the first gateway 102A and the second gateway 102B may be connected to a first base station 112A, while the third gateway 112C may be connected to a second base station 112B. The gateways 102 may connect to particular base stations 112 based on signal strengths or other metrics associated with wireless connections between the gateways 102 and the base stations 112, and/or based on instructions from the network manager 124 as discussed further below.

Different sets of user devices 104, associated with different gateways 102, can have different numbers and/or types of user devices 104, may be associated with different numbers of users, and/or can otherwise vary. For example, the first set of user devices 104A may include a relatively low number of user devices 104, while the second set of user devices 104B may include a higher number of user devices 104 and/or different types of user devices 104 than the first set of user devices 104A. Users associated with the different environments 110 may also use corresponding user devices 104 at different times, to access different services, and/or in other ways that may be associated with different data usage patterns 116.

The different gateways 102 can accordingly determine corresponding device inventories 114 and data usage patterns 116, and can send the device inventories 114 and data usage patterns 116 to one or more network elements 118 of the telecommunication network 106 as discussed above with respect to FIG. 1. For example, the first gateway 102A can determine and send a first device inventory 114A and first data usage patterns 116A associated with the first set of user devices 104A, the second gateway 102B can determine and send a second device inventory 114B and second data usage patterns 116B associated with the second set of user devices 104B, and the third gateway 102C can determine and send a third device inventory 114C and third data usage patterns 116C associated with the third set of user devices 104C.

Accordingly, based on the device inventories 114 and data usage patterns 116 sent by the individual gateways 102, the network manager 124 can determine relative usage levels associated with different gateways 102. The network manager 124 can also use the device inventories 114 and data usage patterns 116 associated with the different gateways 102 to determine and/or predict changes to usage of different gateways 102 over time. Based on such relative usage levels, and/or actual or predicted changes to usage of different gateways 102, the network manager 124 can recommend and/or implement changes to the telecommunication network 106 and/or how gateways 102 connect to the telecommunication network 106. For instance, the network manager 124 can recommend changes to infrastructure of the telecommunication network 106, and/or recommend or implement traffic steering actions, radio resource allocation changes, and/or other actions that can be performed by base stations 112.

As an example, device inventories 114 and data usage patterns 116 reported by gateways 102 in a particular neighborhood may indicate that the gateways 102 in that neighborhood are being used relatively heavily, and/or that usage by the gateways 102 in that neighborhood is projected to increase over a future time period. If current and/or projected future usage of the telecommunication network 106 by the gateways 102, alone and/or in conjunction with phones and other devices that connect directly to the telecommunication network 106, exceeds current network capacity levels and/or may lead to congestion, the network manager 124 may recommend changes to telecommunication network 106 to increase network capacity levels and/or to reduce changes of congestion. For example, the network manager 124 may recommend changes to infrastructure of the telecommunication network 106, such as to add additional base stations 112 that can service the neighborhood, to upgrade existing base stations 112 to add additional network capacity, to add or reconfigure elements of the access network and/or core network to handle increased traffic levels, and/or other types of recommendations. Such recommendations may be output by one or more of the network elements 118 in reports, presented in user interfaces, provided to one or more base stations 112 or other network elements 118, and/or otherwise provided to one or more recipients or destinations.

As another example, data usage patterns 116 reported by the gateways 102 may indicate that user devices 104 associated with the first gateway 102A and the second gateway 102B normally stream high resolution video of football games at the same times on Sundays. The network manager 124 can accordingly determine that the first gateway 102A and the second gateway 102B are both likely to consume relatively high amounts of data at the same times on Sundays, and can recommend and/or perform proactive network actions to mitigate impacts on user experiences and/or the telecommunication network 106.

For example, although the first gateway 102A and the second gateway 102B may both initially be connected to the first base station 112A, the second gateway 102B may also be within a connection range of the second base station 112B. Before the predicted time on a Sunday at which both the first gateway 102A and the second gateway 102B are likely to simultaneously consume relatively high amounts of data due to streaming video of football games, the network manager 124 can instruct the first base station 112A to initiate a handover of the second gateway 102B to the second base station 112B. In this example, the first gateway 102A can remain connected to the first base station 112A. Accordingly, by the time the football games start and the first gateway 102A and the second gateway 102B are likely to simultaneously consume relatively high amounts of data, the first gateway 102A and the second gateway 102B can be connected to different base stations 112. By causing the different gateways 102 to connect to different base stations 112 prior to predicted times of simultaneous high usage levels, performance impacts associated with handling high amounts of traffic simultaneously for multiple gateways 102 can be reduced or mitigated.

Similarly, if different gateways 102 are connected to the same base station, and the network manager 124 determines that the different gateways 102 are using, or are predicted to use, high amounts of data simultaneously, the network manager 124 may instruct the base station to adjust resource allocations associated with wireless connections with one or more of the gateways 102. For instance, if the first gateway 102A and the second gateway 102B are connected to the first base station 112A, and data usage patterns 116 indicate that the first gateway 102A and the second gateway 102B are using, or are likely to use in the future, high amounts of data simultaneously, the network manager 124 may instruct the first base station 112A to assign the first gateway 102A and the second gateway 102B to different spectrum bands, different portions of the same spectrum band, different network slices, or to otherwise use different resources that may reduce or eliminate negative impacts of both gateways using the first base station 112A to receive high amounts of data simultaneously.

Overall, the network manager 124 can use device inventories 114 and data usage patterns 116 reported by one or more gateways 102 to determine current and/or predicted future usage levels associated with one or more gateways 102. The network manager 124 can thus instruct individual gateways 102 to implement local prioritization policies based on the types of user devices 104, corresponding data usage patterns 116, and/or user profiles 122 associated with the individual gateways 102. The network manager 124 can also recommend or implement network actions based on current and/or predicted future usage levels associated with one or more gateways 102. As an example, the network manager 124 can recommend network infrastructure changes to better handle projected future usage increases associated with one or more gateways 102. As another example, the network manager 124 can implement network steering actions that cause different gateways 102 to connect to different base stations 112 and/or different portions of spectrum during predicted times of simultaneous high usage.

Example Architecture

Figure 3:
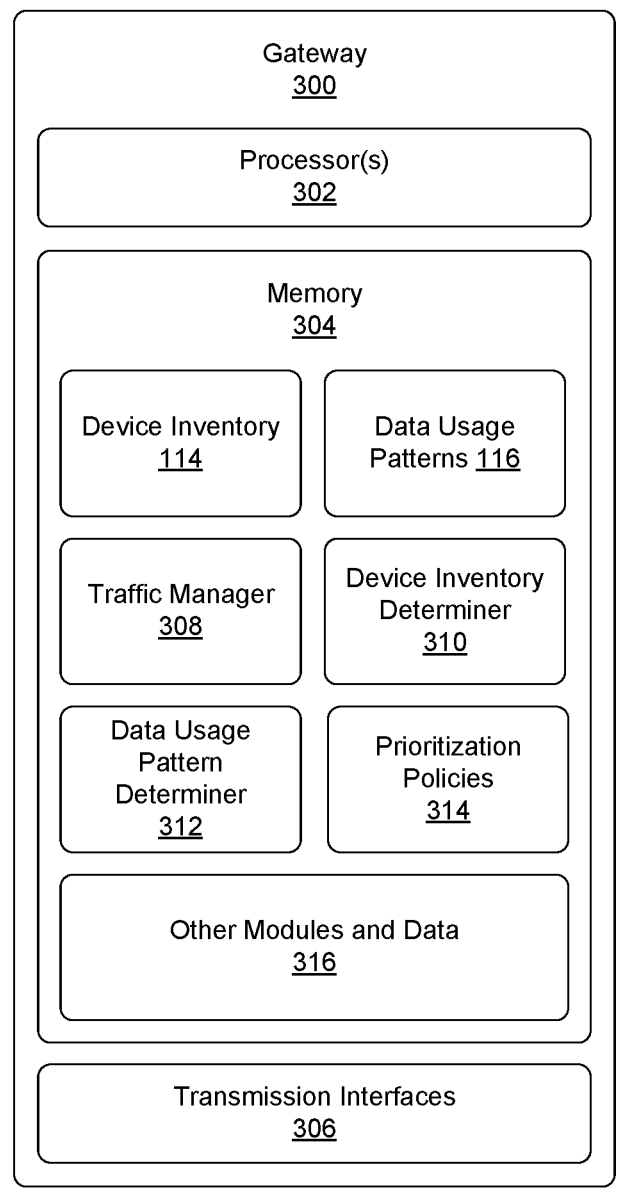
FIG. 3 shows an example system architecture for a gateway.

FIG. 3 shows an example system architecture for a gateway 300, such as the gateway 102 shown in FIG. 1. The gateway 300 can include processor(s) 302, memory 304, and transmission interfaces 306.

In various examples, the processor(s) 302 can be a central processing unit (CPU), a graphics processing unit (GPU), both CPU and GPU, or any other type of processing unit. Each of the one or more processor(s) 302 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 302 may also be responsible for executing all computer-executable instructions and/or computer applications stored in the memory 304.

In various examples, the memory 304 can include system memory, which may be volatile (such as RAM), non-volatile (such as ROM, flash memory, etc.) or some combination of the two. The memory 304 can also include additional data storage devices (removable and/or non-removable) such as, for example, magnetic disks, optical disks, or tape. Memory 304 can further include non-transitory computer-readable media, such as volatile and nonvolatile, removable and non-removable media implemented in any method or technology for storage of information, such as computer-readable instructions, data structures, program modules, or other data. For example, the memory 304 can store software or firmware elements, such as computer-readable instructions that are executable by the one or more processors 302. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, DVD or other optical storage, magnetic cassettes, magnetic tape, magnetic disk storage or other magnetic storage devices, or any other non-transitory medium which can be used to store the desired information and which can be accessed by the gateway 300. Any such non-transitory computer-readable media may be part of the gateway 300.

The memory 304 can store computer-readable instructions and/or other data associated with operations of the gateway 300. As an example, the memory 304 can store the device inventory 114 and/or data usage patterns 116 described above. The memory 304 can also store data and/or computer-readable instructions associated with a traffic manager 308 that can assign IP addresses to user devices 104, route data to and/or from user devices 104, prioritize among user devices 104, and/or other perform other operations. The memory 304 can additionally store data and/or computer-readable instructions associated with a device inventory determiner 310 configured to determine the device inventory 114, and/or a data usage pattern determiner 312 configured to determine the data usage patterns 116. The memory 304 can also store prioritization policies 314, such as prioritization policies 314 provided by the network manager 124, which can be implemented by the traffic manager 308. The memory 304 can additionally store other modules and data 316, which can be utilized by the gateway 300 to perform or enable performing any action taken by the gateway 300. The modules and data 316 can include a platform, operating system, firmware, and/or applications, and data utilized by the platform, operating system, firmware, and/or applications. In some examples, the modules and data 316 may include an instance of the network manager 124 that executes on the gateway 300.

The transmission interfaces 306 can include one or more modems, receivers, transmitters, antennas, Ethernet ports, error correction units, symbol coders and decoders, processors, chips, application specific integrated circuits (ASICs), programmable circuit (e.g., field programmable gate arrays), firmware components, software components, and/or other components through which the gateway 300 can send data to, and/or receive data from, one or more user devices 104, one or more base stations 112, one or more network elements 118, and/or other elements. For example, the gateway 300 can connect with user devices 104 via wired and/or wireless connections via one or more transmission interfaces 306, and use one or more transmission interfaces 306 to wirelessly connect with one or more base stations 112.

Figure 4:
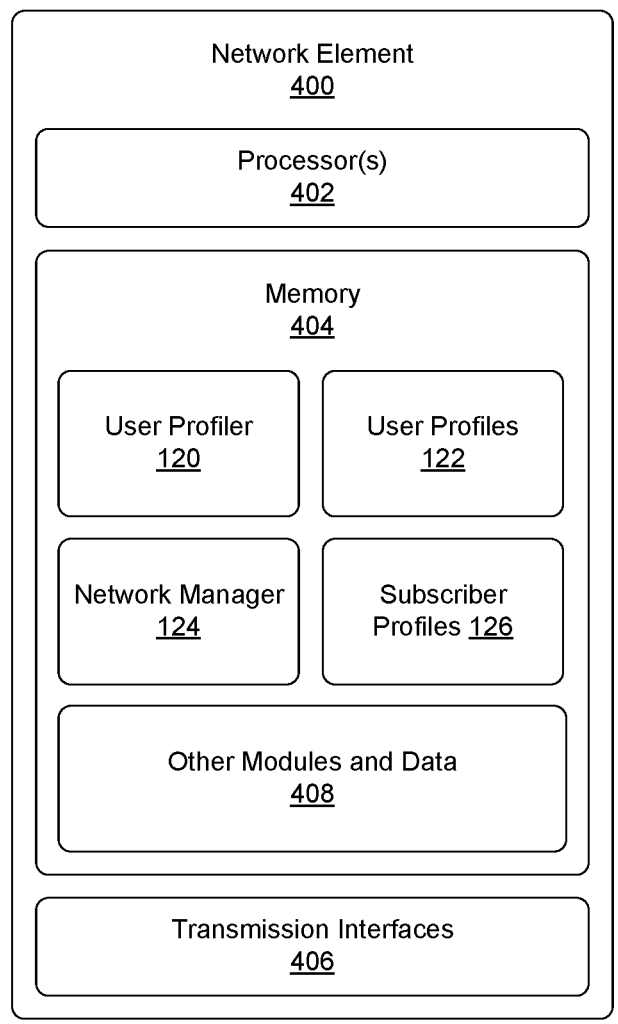
FIG. 4 shows an example system architecture for a network element.

FIG. 4 shows an example system architecture for a network element 400, such as one of the network elements 118 shown in FIG. 1. The network element 400 can include processor(s) 402, memory 404, and transmission interfaces 406. In some examples, the network element 400 can be distinct hardware that implements at least one of the user profiler 120 or the network manager 124. However, in other examples, the network element 400 can be one or more servers, computing systems, or other computing devices that execute the user profiler 120 and/or the network manager 124 as software applications. In some examples, the user profiler 120 and/or the network manager 124, and/or different functions of the user profiler 120 and/or the network manager 124, can be distributed among, and/or be executed by, multiple network elements similar to the network element 400 shown in FIG. 4. For example, the user profiler 120 may execute on a different network element than the network manager 124.

In various examples, the processor(s) 402 can be a CPU, a GPU, both CPU and GPU, or any other type of processing unit. Each of the one or more processor(s) 402 may have numerous ALUs that perform arithmetic and logical operations, as well as one or more CUs that extract instructions and stored content from processor cache memory, and then executes these instructions by calling on the ALUs, as necessary, during program execution. The processor(s) 402 may also be responsible for executing all computer-executable instructions and/or computer applications stored in the memory 404.

In various examples, the memory 404 can include system memory, which may be volatile (such as RAM), non-volatile (such as ROM, flash memory, etc.) or some combination of the two. The memory 404 can also include additional data storage devices (removable and/or non-removable) such as, for example, magnetic disks, optical disks, or tape. Memory 404 can further include non-transitory computer-readable media, such as volatile and nonvolatile, removable and non-removable media implemented in any method or technology for storage of information, such as computer-readable instructions, data structures, program modules, or other data. For example, the memory 404 can store software or firmware elements, such as computer-readable instructions that are executable by the one or more processors 402. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, DVD or other optical storage, magnetic cassettes, magnetic tape, magnetic disk storage or other magnetic storage devices, or any other non-transitory medium which can be used to store the desired information and which can be accessed by the network element 400. Any such non-transitory computer-readable media may be part of the network element 400.

The memory 404 can store computer-readable instructions and/or other data associated with operations of the network element 400, including operations of the user profiler 120 and/or the network manager 124. As an example, the memory 404 can store data and/or computer-readable instructions associated with the user profiler 120, the user profiles 122 generated by the user profiler 120, the network manager 124, and/or subscriber profiles 126 that may be linked to user profiles 122. The memory 404 can also store other modules and data 408, which can be utilized by the network element 400 to perform or enable performing any action taken by the network element 400. The modules and data 410 can include a platform, operating system, firmware, and/or applications, and data utilized by the platform, operating system, firmware, and/or applications.

The transmission interfaces 406 can include one or more modems, receivers, transmitters, antennas, error correction units, symbol coders and decoders, processors, chips, ASICs, programmable circuit (e.g., field programmable gate arrays), firmware components, software components, and/or other components through which the network element 400 can send data to, and/or receive data from, other network elements 118, gateways 102, base stations 112, and/or other elements. For example, the network element 400 can use transmission interfaces 406 to receive device inventories 114 and data usage patterns 116 from gateways 102, and to instruct base stations 112 to perform network steering operations, and/or to provide prioritization policies 314 to gateways 102.

Example Operations

Figure 5:
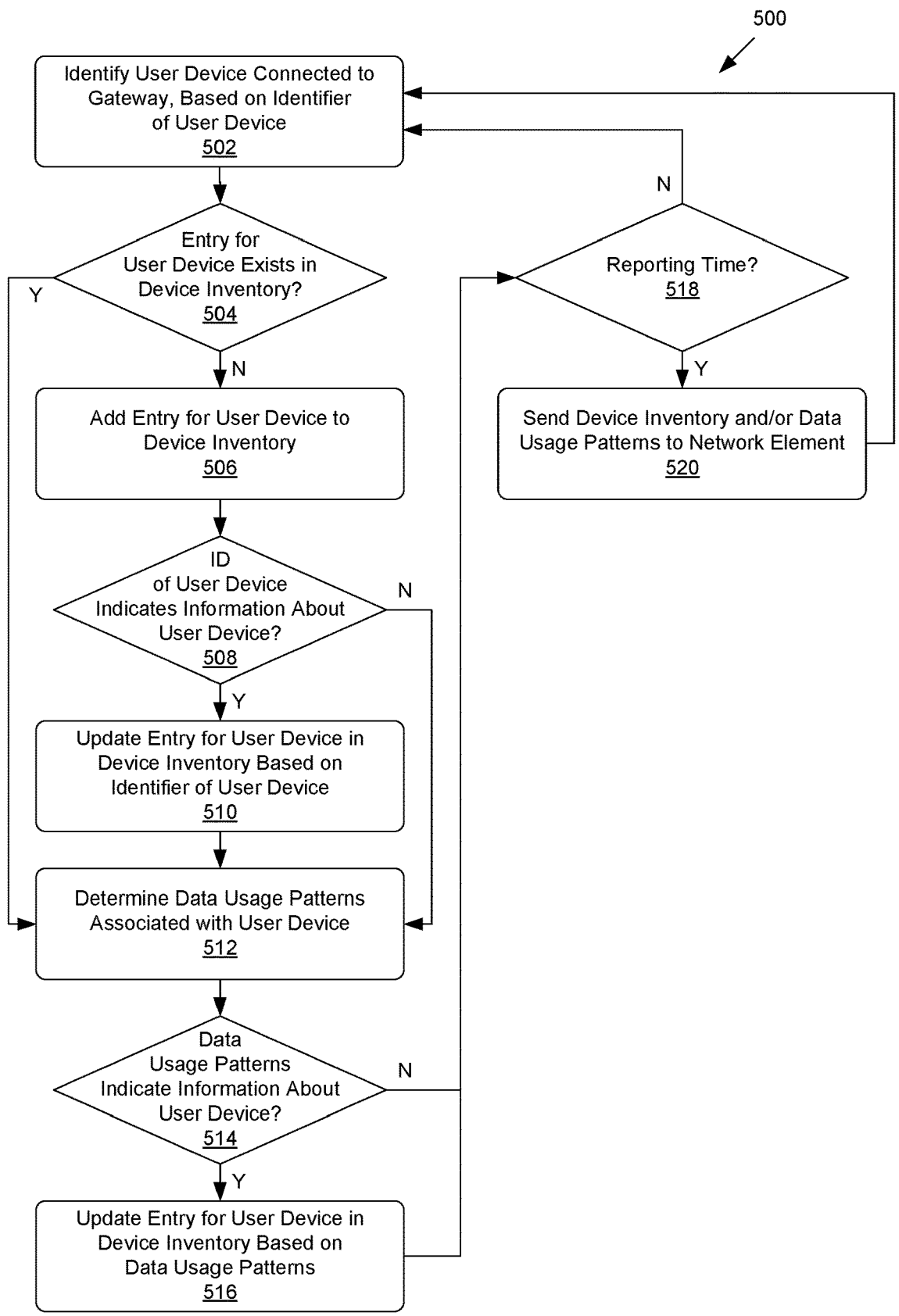
FIG. 5 shows a flowchart of an example method for a gateway to determine and report a device inventory and data usage patterns.

FIG. 5 shows a flowchart of an example method 500 for the gateway 102 to determine and report the device inventory 114 and the data usage patterns 116. At block 502, the gateway 102 can identify a user device connected to the gateway 102, based on an identifier of the user device such as an IP address or MAC address associated with the user device. At block 504, the gateway 102 can determine whether an entry for the user device identified at block 502 already exists in the device inventory 114 maintained by the gateway 102.

If an entry for the user device does not already exist in the device inventory 114 (Block 504—No), the gateway 102 can add such an entry to the device inventory 114 at block 506. For example, the entry can indicate the identifier of the user device determined at block 502. Additionally, the gateway 102 can determine at block 508 whether the identifier of the user device indicates information about the user device, such as a type of user device, a manufacturer name, and/or other information. For example, if the identifier is a MAC address, the gateway 102 can determine whether the MAC address falls within a MAC address range that corresponds with a particular manufacturer and/or device type. If the identifier does indicate such information about the user device (Block 508—Yes), the gateway 102 can update the entry for the user device in the device inventory 114 at block 510 based on the information indicated by the identifier of the user device. For instance, if the MAC address of the user device indicates that the user device was manufactured by a particular manufacturer, the gateway 102 can add the name of the manufacturer to the device inventory 114 at block 510.

If an entry for the user device identified at block 502 already existed in the device inventory 114 (Block 504—Yes), if an identifier of the user device did not indicate any information about the user device that could be used to update a new entry in the device inventory 114 (Block 508—No), or if a new entry was updated in the device inventory 114 at block 510, the gateway 102 can determine data usage patterns 116 associated with the user device at block 512. For example, at block 512, the gateway 102 can track and determine data usage patterns 116 indicating network activity the user device engages in via the gateway 102, such as which external IP addresses the user device sends data to and/or receives data from, domain names indicated by Domain Name System (DNS) queries sent by the user device, amounts of data sent and/or received by the user device, times and/or durations of uploads and/or downloads performed by the user device, and/or other types of network activity. The gateway 102 can determine the data usage patterns 116, or update previous data usage patterns 116 associated with the user device, based on network activity that occurs over a period of hours, days, weeks, or any other period of time.

At block 514, the gateway 102 can determine whether the data usage patterns 116 determined at block 512 indicate information about the user device, such as a type of user device, a manufacturer name, and/or other information. For example, based on the amounts of data associated with uplink and/or downlink transmissions, durations of uplink and/or downlink transmissions, times of day and/or frequencies of uplink and/or downlink transmissions, IP addresses and/or DNS queries associated with uplink and/or downlink transmissions, and/or other information, the gateway 102 may be able determine a type or classification of the user device, a manufacturer name, and/or other information associated with the user device. For instance, even if the gateway 102 determined which manufacturer produced the user device based on a MAC address of the user device at block 508, at block 514 the gateway 102 may be able to additionally use data usage patterns 116 to determine a device type and/or device model produced by the manufacturer that corresponds to the data usage patterns 116, and thus determine that the user device is an instance of that device type and/or device model.

If the data usage patterns 116 determined at block 512 indicate information about the user device (Block 514—Yes), the gateway 102 can update the entry for the user device in the device inventory 114 at block 516 based on the information indicated by the data usage patterns 116. For instance, if the data usage patterns 116 correspond with a particular type of device, the gateway 102 can add the type of the device to the entry for the user device in the device inventory 114 at block 516.

If the data usage patterns 116 determined at block 512 do not indicate information about the user device (Block 514—No), or if the gateway 102 has updated the device inventory 114 based on the data usage patterns 116 at block 516, the gateway 102 can determine at block 518 whether it is time to report the device inventory 114 and/or the data usage patterns 116 to at least one of the network elements 118 of the telecommunication network 106. For example, the gateway 102 can be configured to report the device inventory 114 and/or the data usage patterns 116 to one or more of the network elements 118 at periodic intervals, after updates to the device inventory at block 506, block 510, and/or block 516, based on requests from one or more of the network elements 118, and/or based on any other schedule. Accordingly, if the gateway 102 determines that it is time to report the device inventory 114 and/or the data usage patterns 116 to one or more of the network elements 118 (Block 518—Yes), the gateway 102 can send the device inventory 114 and/or the data usage patterns 116 to one or more of the network elements 118 at block 520.

If the gateway 102 determines that it is not time to report the device inventory 114 and/or the data usage patterns 116 to one or more of the network elements 118 (Block 518—No), or if the gateway 102 has sent the device inventory 114 and/or the data usage patterns 116 to one or more of the network elements 118 at block 520, the gateway 102 can return to block 502 and identify the same user device or a different user device connected to the gateway 102. If the gateway 102 identifies the same user device, and new or updated data usage patterns 116 associated with the user device indicate new information about the user device, the gateway 102 can use that information to correspondingly update the device inventory 114. If the gateway 102 identifies another user device, such as user device that has newly connected to the gateway 102 or another user device that is already listed in the device inventory 114, the gateway 102 can add and/or update a corresponding entry in the device inventory 114 as shown in FIG. 5. The gateway 102 can accordingly update the device inventory 114 and data usage patterns 116, associated with one or more user devices 104 connected to the gateway 102, continuously or periodically, and can also periodically or occasionally send copies of the device inventory 114 and data usage patterns 116 to one or more of the network elements 118.

Figure 6:
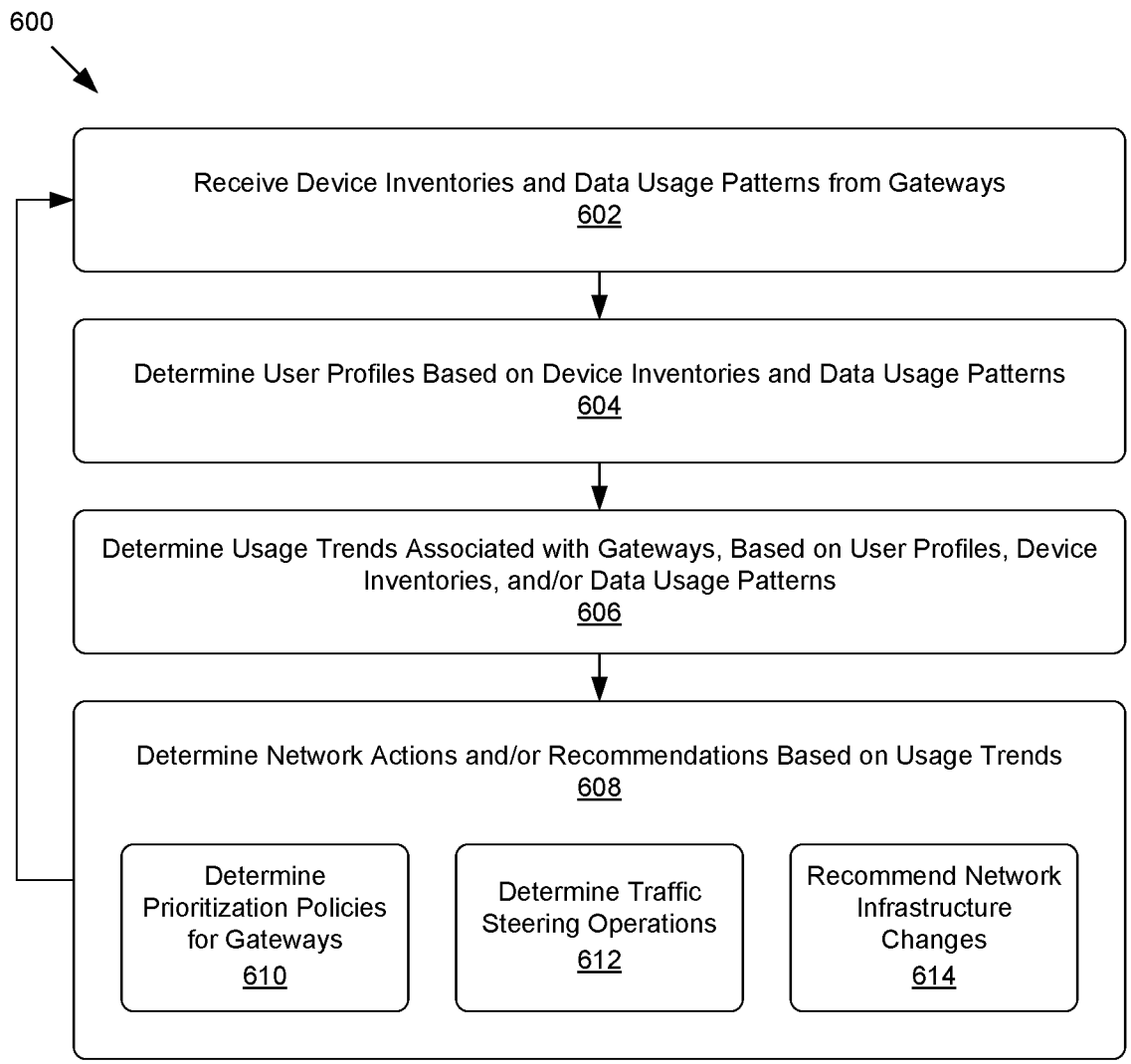
FIG. 6 shows a flowchart of an example method for one or more network elements to determine user profiles and network actions based on device inventories and data usage patterns.

FIG. 6 shows a flowchart of an example method 600 for the one or more network elements 118 to determine user profiles 122 and network actions based on device inventories 114 and data usage patterns 116. At block 602, the one or more network elements 118 can receive device inventories 114 and data usage patterns 116 from one or more gateways 102. Based on the device inventories 114, the one or more network elements 118 can determine how many user devices 104, and/or which types of user devices 104, are associated with each of the gateways 102. The one or more network elements can also determine, based on the data usage patterns 116, how individual user devices 104 and/or sets of user devices 104 associated with each of the gateways 102 are being used.

At block 604, the user profiler 120 of the one or more network elements 118 can determine one or more user profiles 122 associated with one or more of the gateways 102, based on corresponding device inventories 114 and data usage patterns 116. For example, if a device inventory and/or data usage patterns 116 associated with a particular gateway indicates that a relatively large number of user devices 104 is often used simultaneously via the gateway, the user profiler 120 can infer that it is likely that multiple users are using those user devices 104. The user profiler 120 can create and/or update corresponding user profiles 122 that indicate preferences and/or usage data associated with corresponding users. For example, the user profiles 122 can indicate which user devices 104 individual users use, types of services the users engage in via user devices 104, days and/or times of day the users use the user devices 104 and/or particular services, life events of the users, and/or other information.

At block 606, the network manager 124 of the one or more network elements 118 can determine usage trends associated with the one or more of the gateways 102, based on corresponding user profiles 122, device inventories 114, and/or data usage patterns 116. In some examples, the network manager 124 can determine usage trends at block 606 based on past usage of the gateways 102. For instance, the network manager 124 can determine whether amounts of data sent and/or received by a gateway has increased or decreased over time, whether the number of user devices 104 connected to the gateway has increased or decreased over time, whether the number of user devices 104 that use data simultaneously via the gateway has increased or decreased over time, which types of services are routinely used by one or more user devices 104 and at what times, and/or any other types of usage trends.

In other examples, at block 606 the network manager 124 can predict future usage of the gateways 102. For example, the network manager 124 can predict which services are likely to be used in the future via a gateway, which times such services are likely to be used, future increases or decreases in amounts of data sent and/or received by the gateway, future increases or decreases to the number of user devices 104 connected to the gateway, future changes to the number of user devices 104 that use data simultaneously via the gateway, and/or other types of predicted usage trends.

At block 608, the network manager 124 can determine one or more network actions and/or recommendations based on the past and/or predicted future usage trends determined at block 606. For example, if the network manager 124 determines that multiple user devices 104 associated with a particular gateway are likely to be used simultaneously at a future time, the network manager 124 can determine based on device types indicated in a corresponding device inventory which of those user devices should have a higher priority. Accordingly, the network manager 124 can determine a corresponding prioritization policy that indicates relative priorities of user devices 104, and can provide the prioritization policy to the gateway at block 610 such that the gateway can implement the prioritization policy.

As another example, the network manager 124 can determine traffic steering operations at block 612, based on past and/or predicted future usage trends determined at block 606. For example, if the network manager 124 predicts that a particular gateway is likely to be sending or receiving one or more types of data for one or more user devices 104 at a future time, but current network resources associated with the gateway may be insufficient to handle that data, the network manager 124 can determine traffic steering operations that may increase the chances of the data being sent or received from the gateway without interruptions. For instance, the network manager 124 may instruct a base station to handover the gateway to a different base station that has more capacity, change spectrum resources used to communicate with the gateway, and/or otherwise adjust network resources associated with the gateway. As another example, if the network manager 124 predicts that multiple gateways 102 are likely to be sending or receiving one or more types of data at a future time that may lead to interference, congestion, or other interruptions, the network manager 124 can cause the gateways 102 to connect to different base stations 112, or connect to the same base station via different portions of spectrum or other different radio resources, prior to the predicted time of simultaneous usage.

As still another example, the network manager 124 can recommend network infrastructure changes at block 614, based on the past and/or predicted future usage trends determined at block 606. For example, if the network manager 124 determines that current capacity levels associated with one or more base stations 112, or other elements of the telecommunication network 106, are insufficient to handle current and/or predicted usage levels associated with one or more gateways 102, the network manager 124 can recommend network infrastructure changes that may increase the ability of the telecommunication network 106 to handle the current and/or predicted usage. For example, the network manager 124 can that base stations 112 be added and/or upgraded in one or more locations where usage of gateways 102 has been increasing or is predicted to increase in the future.

The one or more network elements 118 can periodically, occasionally, or continuously repeat the operations shown in FIG. 6 based on new or updated device inventories 114 and/or data usage patterns 116 received from gateways 102. For example, as new or updated device inventories 114 and/or data usage patterns 116 are received, the user profiler 120 can correspondingly determine new user profiles 122 and/or update user profiles 122. Similarly, as new or updated device inventories 114 and/or data usage patterns 116 are received, and/or as user profiles are created or updated, the network manager 124 can determine new usage trends and/or update previously-determined usage trends, and can use those usage trends to determine new or updated network actions.

Conclusion

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method, comprising:
   receiving, by at least one network element of a telecommunication network, and from one or more gateways connected wirelessly to the telecommunication network, device inventories of sets of user devices connected to the one or more gateways;
   receiving, by the at least one network element, and from the one or more gateways, data usage patterns associated with the sets of user devices;
   determining, by the at least one network element, usage trends associated with at least one of the one or more gateways based on at least one of the device inventories or the data usage patterns; and
   determining, by the at least one network element, at least one network action based on the usage trends, wherein determining the network action comprises determining at least one traffic steering operation to proactively mitigate an impact on the telecommunication network based on predicted future usage, and the at least one traffic steering operation comprises causing different gateways, of the multiple gateways, to wirelessly connect to different base stations of the telecommunication network prior to and during the predicted future usage.

2. The method of claim 1, wherein the device inventories indicate at least one of device types or manufacturer names of individual user devices.

3. The method of claim 1, wherein the data usage patterns indicate at least one of:
   services used by one or more user devices, of the sets of user devices, via the one or more gateways,
   amounts of data sent or received by the one or more user devices via the one or more gateways, or
   times that the one or more user devices sent or received the data via the one or more gateways.

4. The method of claim 1, wherein:
   the device inventories include a device inventory, received from a gateway of the one or more gateways, of a set of user devices connected to the gateway, and
   the at least one network action comprises:
   determining, by the at least one network element, a prioritization policy based on the device inventory and the data usage patterns, the prioritization policy indicating relative priority levels of different user devices or different services; and
   sending, by the at least one network element, the prioritization policy to the gateway to cause the gateway to prioritize traffic of the different user devices or the different services based on the prioritization policy.

5. The method of claim 4, further comprising:
   determining, by the at least one network element, user profiles based on the device inventory and the data usage patterns, the user profiles indicating at least one of the different user devices or the different services associated with different users, and
   determining, by the at least one network element, the prioritization policy based at least in part on the user profiles.

6. The method of claim 1, wherein determining the usage trends comprises:
determining, by the at least one network element, the predicted future usage of the telecommunication network by multiple gateways; and
predicting, by the at least one network element, the impact on the telecommunication network based on the predicted future usage.

7. The method of claim 6, wherein:
the at least one traffic steering operation further comprises:
causing a base station of the telecommunication network to use different radio resources to wirelessly connect to the different gateways prior to and during the predicted future usage.

8. The method of claim 6, wherein the impact is based on determining that the predicted future usage is higher than capacity levels of the telecommunication network, and the network action is a recommendation to change infrastructure of the telecommunication network to increase the capacity levels of the telecommunication network based at least in part on the predicted future usage.

9. A system, comprising:
one or more network elements of a telecommunication network;
one or more base stations of the telecommunication network; and
one or more gateways,
wherein the one or more gateways are configured to:
wirelessly connect to the one or more base stations;
connect locally to sets of user devices to provide the sets of user devices with Internet access via the telecommunication network;
determine device inventories and data usage patterns associated with the sets of user devices; and
send the device inventories and the data usage patterns to the one or more network elements, and
wherein the one or more network elements are configured to:
determine usage trends associated with at least one of the one or more gateways based on at least one of the device inventories or the data usage patterns;
determining predicted future usage of the telecommunication network by multiple gateways; and
predicting an impact on the telecommunication network based on the predicted future usage, wherein the impact is based on determining that the predicted future usage is higher than capacity levels of the telecommunication network; and
perform at least one network action based on the usage trends, wherein the at least one network action includes a recommendation to change infrastructure of the telecommunication network to increase the capacity levels of the telecommunication network based at least in part on the predicted future usage.

10. The system of claim 9, wherein:
the device inventories include a device inventory, received from a gateway of the one or more gateways, of a set of user devices connected to the gateway, and
the at least one network action comprises:
determining a prioritization policy, based on the device inventory and the data usage patterns, indicating relative priority levels of different user devices or different services; and
sending the prioritization policy to the gateway to cause the gateway to prioritize traffic of the different user devices or the different services based on the prioritization policy.

11. The system of claim 9, wherein:
the at least one network action further comprises at least one traffic steering operation to proactively mitigate the impact on the telecommunication network based on the predicted future usage, and
the at least one traffic steering operation comprises at least one of:
causing different gateways, of the multiple gateways, to wirelessly connect to different base stations, of the one or more base stations, prior to and during the predicted future usage, or
causing a base station, of the one or more base stations, to use different radio resources to wirelessly connect to the different gateways prior to and during the predicted future usage.

12. A gateway comprising:
one or more processors;
one or more transmission interfaces, wherein the one or more transmission interfaces are configured to:
connect wirelessly to at least one base station of a telecommunication network; and
connect locally to one or more user devices via at least one of local wired connections or local wireless connections; and
memory storing computer-executable instructions that, when executed by the one or more processors, cause the one or more processors to perform operations comprising:
determining a device inventory of the one or more user devices;
determining data usage patterns associated with the one or more user devices;
sending the device inventory and the data usage patterns to at least one network element of the telecommunication network;
receiving a prioritization policy from the at least one network element, wherein:
the at least one network element determined the prioritization policy based on at least one of the device inventory and the data usage patterns, and
the prioritization policy indicates relative priority levels of different services; and
prioritizing traffic handled by the gateway based on the relative priority levels indicated by the prioritization policy.

13. The gateway of claim 12, wherein the device inventory indicates at least one of device types or manufacturer names associated with the one or more user devices.

14. The gateway of claim 12, wherein the data usage patterns indicate at least one of:
services used by the one or more user devices via the gateway,
amounts of data sent or received by the one or more user devices via the gateway, or
times that the one or more user devices sent or received the data via the gateway.

15. The gateway of claim 12, wherein the computer-executable instructions cause the one or more processors to determine the device inventory based on at least one of:
unique identifiers associated with different user devices of the one or more user devices,
the data usage patterns associated with the different user devices, or connection types of connections between the different user devices and the gateway.

16. The gateway of claim 15, wherein the computer-executable instructions are based on a model configured to determine device types of the one or more user devices based on combinations of two or more of the unique identifiers, the data usage patterns, or the connection types.

17. The gateway of claim 12, wherein:
the at least one base station is a first base station, and
the operations further comprise at least one of connecting the gateway to a second base station of the telecommunication network, or adjusting a connection of the gateway to the first base station, based on a traffic steering operation determined by the at least one network element, and
the at least one network element determined the traffic steering operation based on at least one of the device inventory and the data usage patterns.

* * * * *